June 30, 1953  L. G. RINDERKNECHT  2,643,600
GAP FILLER USED FOR IRRIGATION PURPOSES
Filed Oct. 31, 1950  2 Sheets-Sheet 1
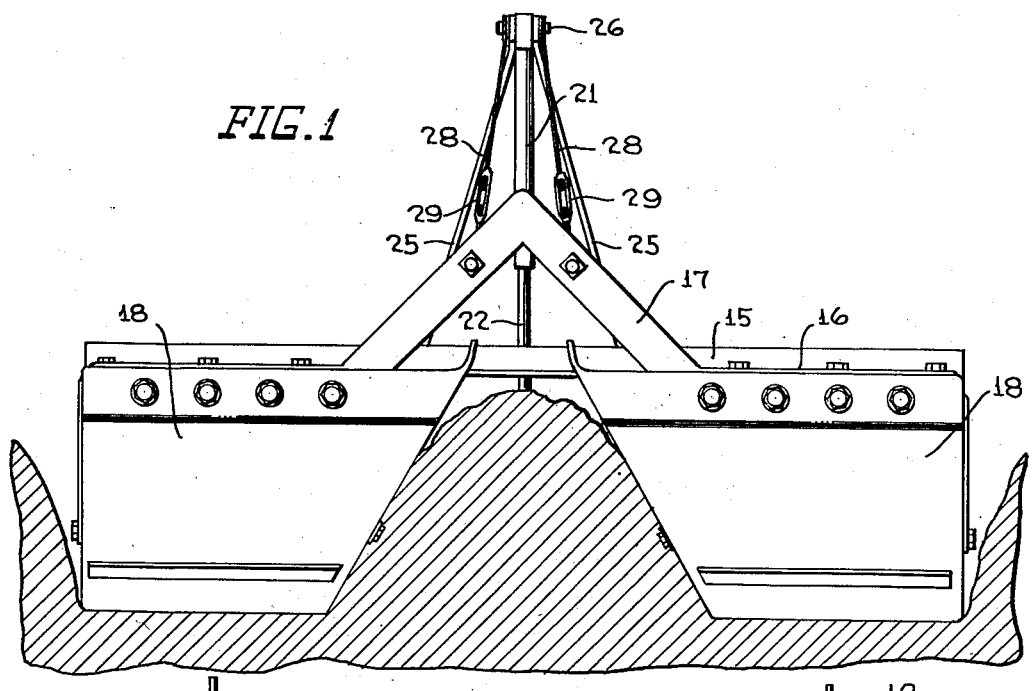
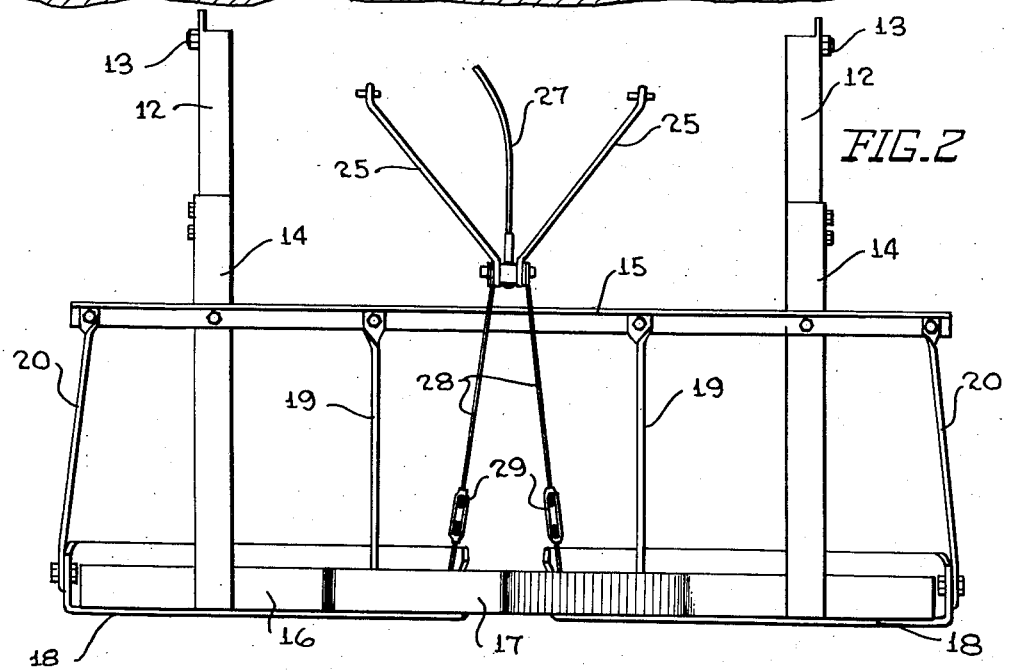
INVENTOR.
LOUIS G. RINDERKNECHT
BY
McMorrow, Berman & Davidson
ATTORNEYS June 30, 1953   L. G. RINDERKNECHT   2,643,600
GAP FILLER USED FOR IRRIGATION PURPOSES
Filed Oct. 31, 1950   2 Sheets-Sheet 2

INVENTOR.
LOUIS G. RINDERKNECHT
BY
McMorrow, Berman & Davidson
ATTORNEYS

Patented June 30, 1953

2,643,600

UNITED STATES PATENT OFFICE 2,643,600

GAP FILLER USED FOR IRRIGATION PURPOSES

Louis G. Rinderknecht, Escalon, Calif.

Application October 31, 1950, Serial No. 193,138

2 Claims. (Cl. 97—55)

This invention relates to land-irrigating equipment, and more particularly to a gap-filling attachment for a ridging machine.

A main object of the invention is to provide a novel and improved gap-filling attachment for a ridging machine employed in land irrigation, the attachment being simple in construction, being easy to connect to a conventional ridging machine, and providing a great saving in time and labor required to fill in the gaps in irrigation levees or ridges formed by the operation of a ridging machine.

A further object of the invention is to provide an improved gap-filling apparatus for use with a conventional irrigation ridging machine, said apparatus being inexpensive to fabricate, involving relatively few parts, being rugged in construction, and being easy to control.

Further objects and advantages of the invention will become apparent from the following description and claims, and from the accompanying drawings, wherein:

Figure 1 is a rear elevational view of a gap-filling attachment for a ridging machine constructed according to the present invention;

Figure 2 is a top plan view of the gap-filling attachment shown in Figure 1;

Figure 3:
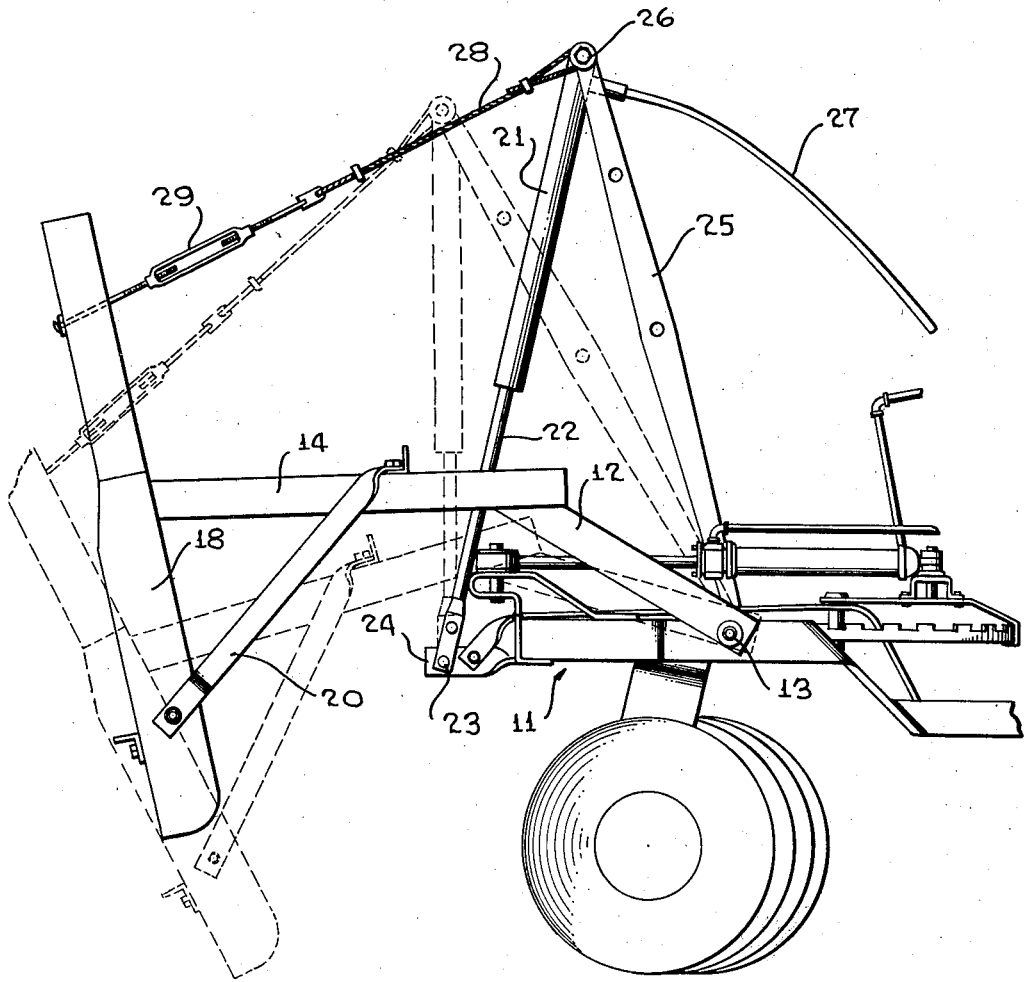
Figure 3 is a side elevational view of the gap-filling attachment of Figures 1 and 2, shown connected to the rear portion of a conventional irrigation ridging machine.

Referring to the drawings, and more particularly to Figure 3, 11 generally designates a conventional ridging machine employed in land irrigation to construct ridges or levees around areas to be irrigated. In forming such ridges or levees, the machine may be employed so as to first plow through the earth to produce ridges in one direction, and then traverse the land in a direction substantially at right angles to the first ridges to put up the additional ridges to provide basins or depressions surrounded by ridges. However, in crossing the initially constructed ridges, the ridger cuts through and leaves gaps in the originally produced ridges which must be shoveled in or filled in by hand or with some suitable gap-filling apparatus.

In accordance with the present invention, a pair of longitudinally extending drawbar members 12, 12 are pivotally connected at 13, 13 to the rear portion of the frame of the ridger 11, each drawbar member 12 having rigidly connected thereto the longitudinal supporting bar 14. As shown in Figure 3, the bar 14 is inclined with respect to the drawbar 12. Bars 14, 14 extend parallel to each other and are connected at their intermediate portions by a transverse bar member 15. Secured to the ends of the support bars 14, 14 is another transverse bar member 16 which is formed with the upwardly arched intermediate portion 17. Designated at 18, 18 are respective depending, forwardly facing shovel or scoop members which are secured at their top margins to the side portions of the transverse bar members 16, and which are connected to the transverse bar member 15 by the respective pairs of tie bars 19 and 20. Each pair of tie bars 19 and 20 connects the lower side portions of its associated scoop member 18 to the transverse bar member 15, thereby rigidly bracing the scoop members with respect to the longitudinal support bars 14, 14.

Designated at 21 is a hydraulic cylinder having the piston rod 22 which is pivotally connected at 23 to a bracket bar 24 projecting from the rear end of the frame of the ridging machine substantially in the median, longitudinal, vertical plane thereof. Designated at 25, 25 are respective upwardly and inwardly inclined link bars which are pivotally connected at their lower ends to the frame of the ridging machine 11 on a common transverse axis. The top ends of the link bars 25, 25 are pivotally connected to the top end of the hydraulic cylinder 21, as by a transverse bolt 26. Designated at 27 is a flexible conduit connecting the cylinder 21 to the fluid pressure pump of the tractor associated with the ridging machine 11. Designated at 28, 28 are respective flexible cables connecting the pivotally connected top ends of the cylinder 21 and link bars 25 to the respective side portions of the arch 17, the cable members 28 including respective turnbuckles 29 for adjusting the length of the cables. By regulating the length of the cables 28, 28 by means of turnbuckles 29, 29, the position of the shovel members 18, 18 relative to the frame of the ridging machine may be regulated for either the expanded or contracted condition of the hydraulic link defined by cylinder 21 and piston rod 22.

When the extensible hydraulic link defined by members 21 and 22 is in its expanded condition, shown in full line view in Figure 3, the shovel members 18, 18 are in elevated positions. When the link defined by members 21 and 22 is in its contracted condition, the shovel members 18, 18 are in their depressed or digging positions. In operation of the machine, the shovels 18, 18 are allowed to remain in their depressed or digging positions until the machine traverses a ridge whose gap is to be filled. As soon as the shovel members 18, 18 reach the gap, hydraulic fluid is introduced into cylinder 21, causing the members 21 and 22 to become extended to the full line position shown in Figure 3, and causing the shovel members 18, 18 to be elevated, thereby dumping the earth scooped by said members into the gap to be filled. This operation is accomplished very quickly, and with a minimum of manual effort. As soon as the gap has been filled and the machine has passed over the ridge, the cylinder 21 is allowed to exhaust, and the shovel members 18, 18 are again allowed to descend to their digging positions in preparation for filling the next gap.

While a specific embodiment of an improved gap-filling apparatus for use in filling gaps in irrigation ridges has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a ridging machine, a frame, a pair of longitudinal drawbar members pivotally secured to said frame and extending rearwardly therefrom, a transverse bar member connecting the intermediate portions of said drawbar members, a pair of transversely extending shovel members secured in side-by-side, spaced relation to the ends of said drawbar members, an arched bar rigidly connecting the top portions of said shovel members, a plurality of tie bars connecting said shovel members to said transverse bar member, a pair of upwardly and inwardly inclined strut bars pivoted to said frame, an extensible hydraulic link connected between said frame and the top ends of said strut bars, the connection of the hydraulic link to the frame being located rearwardly of the pivotal connections of the drawbar members to said frame, and means connecting said strut bars to the arched bar, whereby extension of said hydraulic link elevates said shovel members.

2. In a ridging machine, a frame, a pair of longitudinal draw bar members having the forward ends thereof pivotally secured to said frame and extending rearwardly therefrom, a transverse bar member connecting the intermediate portions of said draw bar members, a pair of transversely extending shovel members fixedly secured in side by side spaced relation to the rear ends of said draw bar members, an arched bar rigidly connecting the top portions of said shovel members, a plurality of tie bars connecting said shovel members adjacent the lower ends thereof to said transverse bar member, and hydraulically controlled elevating means connected between said arched bar and said frame and arranged to elevate said draw bar members as a unit responsive to the will of the operator.

LOUIS G. RINDERKNECHT.

References Cited in the file of this patent
UNITED STATES PATENTS

| Number | Name | Date |
|---|---|---|
| 1,934,645 | Rhodes | Nov. 7, 1933 |
| 2,107,967 | Taylor | Feb. 8, 1938 |
| 2,172,994 | Thompson | Sept. 12, 1939 |
| 2,455,566 | Deakins | Dec. 7, 1948 |
| 2,593,679 | Kaupke | Apr. 22, 1952 |